April 28, 1953      A. BAKANE      2,636,757
BALL AND SOCKET JOINT
Filed April 30, 1951
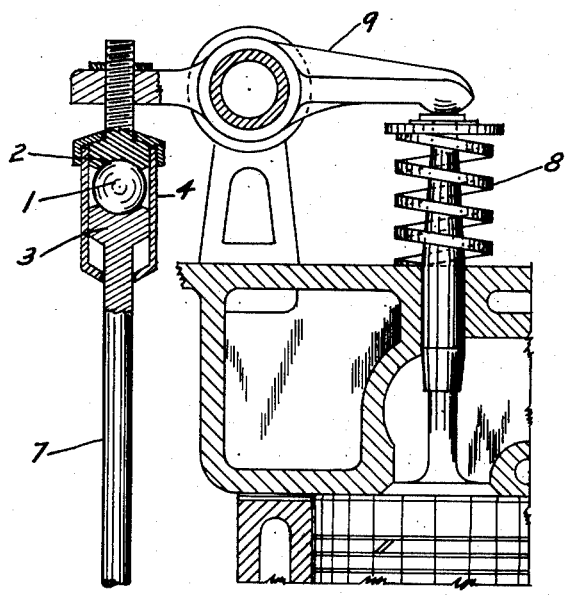
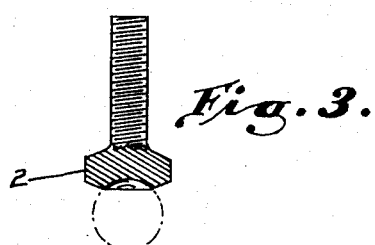
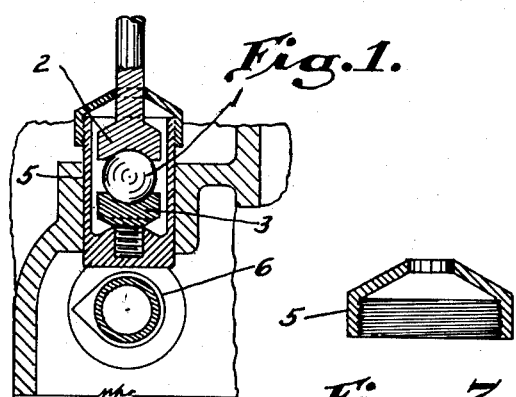
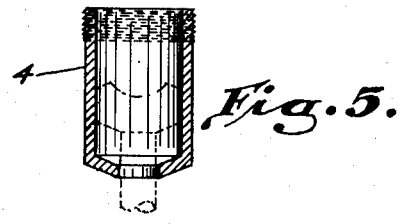
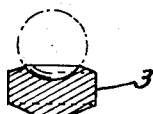
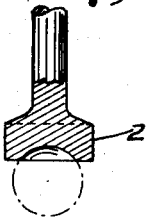
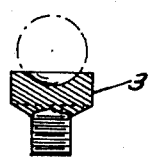
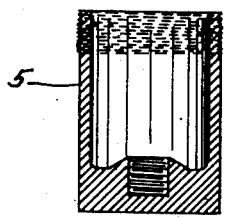
INVENTOR.
Anthony Bakane
BY Chas. Denegre
Attorney.

Patented Apr. 28, 1953

2,636,757

UNITED STATES PATENT OFFICE 2,636,757

BALL AND SOCKET JOINT

Anthony Bakane, Birmingham, Ala.

Application April 30, 1951, Serial No. 223,772

2 Claims. (Cl. 287—87)

This invention relates to a ball and socket joint. It has for its main objects to provide such a joint that will be highly efficient for the purpose intended, simple in structure, comparatively cheap to manufacture, and extremely durable. It is especially intended for use in the valve mechanism of overhead valves of internal combustion motors and the like, but may also be used in other kinds of machinery where long and satisfactory use is required. At the present time there are various kinds of ball and socket joints in use, but none to my knowledge make use of a free ball which is the main feature of the present invention.

Other objects and advantages will appear from the drawing and description.

By referring generally to the drawing, a part of this application, it will be observed that Fig. 1 is a vertical view, part in section and part full, showing two ball and socket joints according to the present invention as used in the valve operating mechanism of an internal combustion motor of the overhead-valve type used in some automobiles; Figs. 2, 3, 4, 5, 6, 7, 8 and 9 are views in detail showing the parts used in the ball and socket joints shown assembled in Fig. 1.

Similar reference numerals refer to similar parts throughout the several views.

Referring to the drawing in detail it will be seen that the joint comprises a ball 1 positioned between sockets 2 and 3. The joints are enclosed within suitable housings 4 and 5. A cam 6 in operation moves the push rod 7 upward and the spring 8 of the valve lever 9 pushes the rod downward, thereby causing the balls of the two joints to be free for moving around as they are not held rigid by any fixed or integral contacts.

The joints are shown as used in the mechanism of an overhead valve of a motor, but they are not limited to such use, and may be used in any mechanical structure where extremely long wearing ball and socket joints are required.

The various parts of the joints may be made in different sizes and capacities, depending on where and how to be used. Also the parts may be made of any kind of metal suitable for the purpose, but I prefer to use high grade metal for all parts, especially the balls.

While I have shown and described the preferred embodiment of my invention, I do not wish to limit same to the exact and precise details of structure, but reserve the right to make all modifications and changes, so long as they remain within the scope of the invention and the following claims.

Having described my invention I claim:

1. A ball and socket joint of the character described comprising a round metal housing with an integral closed end as the bottom thereof and a screwed-on removable top, the outer face of said bottom being flat and adapted to fit upon and be moved upward and downward by a cam of an internal combustion motor, said housing bottom having a threaded hole partly through the inner face thereof, a socket member having a threaded end, said end being screwed into said threaded hole in said bottom, the other end of the socket member being concaved round, a ball seated in said concaved end, a push rod, said rod having a concaveness in each end thereof, the concaveness of one end positioned adjacent the opposite side of said ball, the removable top of said housing having a round hole therethrough, the lower end portion of the rod being inserted through the hole in the housing, said socket member in the housing being adapted for adjustment upward and downward by its threaded end in the threaded hole in the bottom of the housing.

2. A ball and socket joint of the character described comprising a round metal housing with a removable end, said end having a hole therethrough, a socket member, said socket member having a threaded end portion and a concaved opposite end, the other end of the housing having a round hole therethrough, a push rod, said rod having a concaved end, said end being in the housing, said rod extending from said concaved end and through said hole in the housing, a ball positioned between the said concaved ends.

ANTHONY BAKANE.

References Cited in the file of this patent

UNITED STATES PATENTS

| Number | Name | Date |
|---|---|---|
| 460,952 | Converse | Oct. 13, 1891 |
| 1,573,962 | Charnock | Feb. 23, 1926 |
| 2,030,345 | Zahodiakin | Feb. 11, 1936 |